United States Patent [19]
Jones et al.

[11] Patent Number: 4,629,161
[45] Date of Patent: Dec. 16, 1986

[54] GATE VALVE

[75] Inventors: Taylor L. Jones; Paul D. Bunch; Russell E. Stevens, all of Houston, Tex.

[73] Assignee: Cameron Iron Works, Inc., Houston, Tex.

[21] Appl. No.: 729,622

[22] Filed: May 2, 1985

[51] Int. Cl.$^4$ .............................................. F16K 1/46
[52] U.S. Cl. .................................... 251/328; 251/327; 251/362
[58] Field of Search ............... 251/326, 327, 328, 329, 251/362, 360, 363; 137/454.6

[56] References Cited

U.S. PATENT DOCUMENTS

| | | | |
|---|---|---|---|
| 769,831 | 9/1904 | Ogden | 251/328 |
| 2,626,775 | 1/1953 | Lange et al. | 251/328 |
| 3,689,028 | 9/1972 | Dickenson et al. | 251/360 X |
| 4,017,058 | 4/1977 | Morrison | 251/328 |
| 4,434,967 | 3/1984 | Vanderburg | 251/327 X |

Primary Examiner—Martin P. Schwadron
Assistant Examiner—John S. Starsiak, Jr.
Attorney, Agent, or Firm—Vinson & Elkins

[57] ABSTRACT

A gate valve having a body with a valve chamber therein, an inlet passage through the body into the valve chamber, an outlet passage through the body into the valve chamber, a gate positioned within the chamber and having an opening therethrough, a body sealing surface surrounding the openings of each of the inlet and outlet passages within the passages within the chamber, a seat ring positioned between the gate and each of the body sealing surfaces, means for urging the seat rings against their body sealing surfaces, resilient seals between each seat ring and its body sealing surface near the inner and outer diameter of each ring, means for sealing between the gate and the seal rings, and means for moving said gate in said chamber to close and open flow through said valve. The means urging the seat rings against their body sealing surfaces in one form includes wedges positioned at the side of the gate engaged between the two seat rings and in another form includes springs positioned at the sides of the gate engaged between the two seat rings.

4 Claims, 7 Drawing Figures

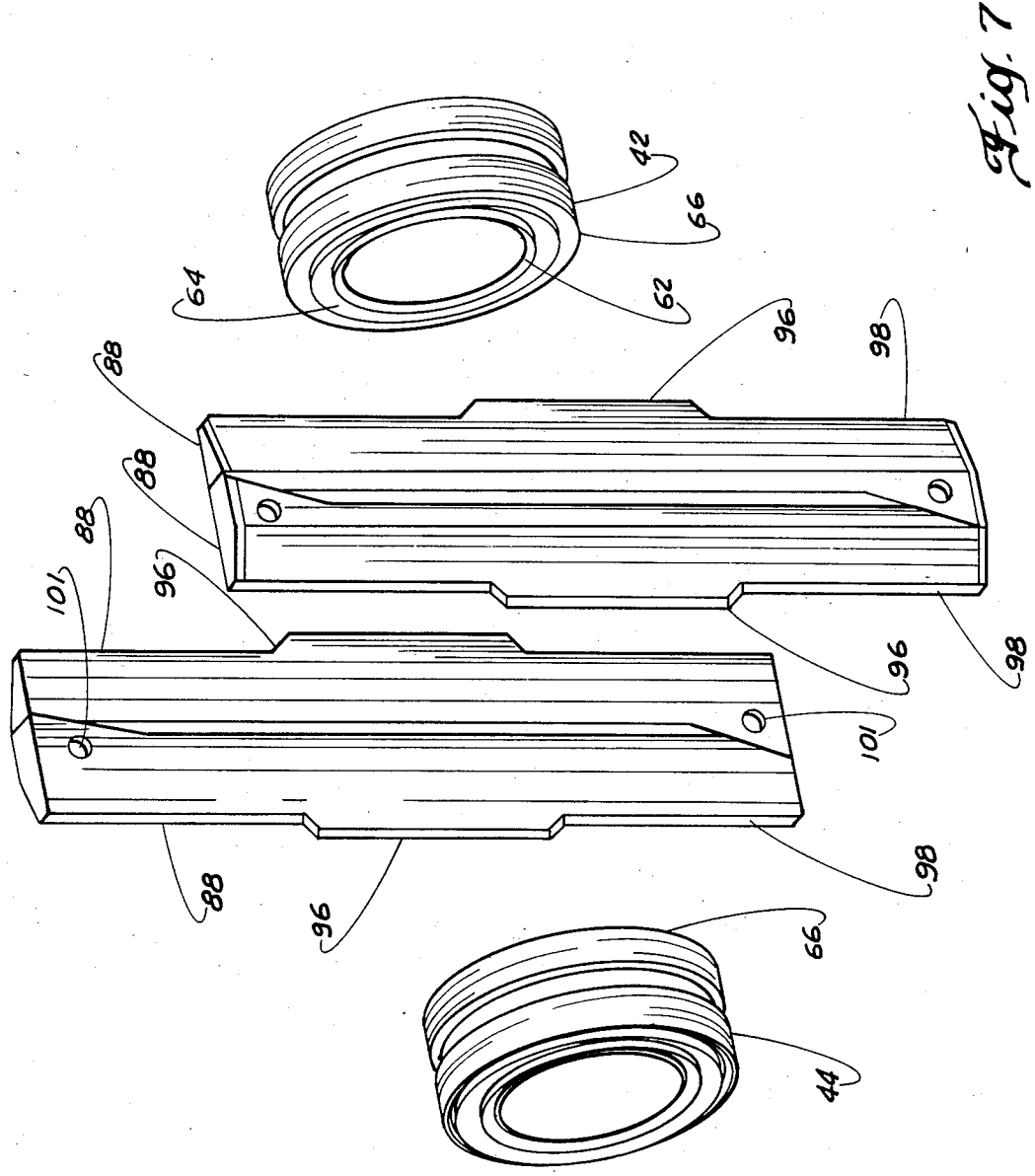

GATE VALVE

BACKGROUND

Gate valves generally have seat rings which provide the seats for the gate and which also engage with body surfaces surrounding the inlet and outlet passages through the body. In prior structure such seat rings have been made to be floating and have been installed in the body with a suitable spacer means to ensure that there is the desired clearance between the seat rings for movement of the gate without binding.

Examples of various types of prior structures used for maintaining the seat ring spacing in gate valves are disclosed in U.S. Pat. Nos. 4,188,016 (pair of opposed spacer carriers); 4,179,098 (spacer plates); 3,823,911 (spacer blocks); and 4,193,581 (a cage engaging lugs on the seat rings). All of such structures ensure the spacing for the gate and allow floating movement of the seat rings. The sealing of the seat rings against the body sealing surfaces is provided by resilient seals, such as O-rings.

In maintaining the seal of the seat in a gate valve, efforts have been made to utilize pressure of the fluid flowing through the valve to urge the seats in directions toward their respective body sealing surfaces. An example of such structure is disclosed in U.S. Pat. No, 4,487,393 in which the effective diameter of the seat seal against the body sealing surface is less than the effective diameter of the seal against the gate so that there is an effective pressure area exposed to the fluid pressure within the valve flow passages which urges the seats toward their body sealing surfaces. One disadvantage of such structure is that pressure which collects in the valve chamber works against this sealing force.

One of the difficulties encountered with such prior structures is washout of the seat rings which results from the collection of sand or other foreign particles between the seat ring and its body sealing surface.

Another problem encountered with prior gate valves has been that the seat rings are exposed to an unbalanced pressure which can urge the seat rings away from their body sealing surface and this allows entry of particles which can result in seat ring washout.

SUMMARY

The present invention provides an improved gate valve having seat rings with means for maintaining the seat rings against their respective body sealing surface in tight contact and with the pressure forces to which the seat rings are exposed resulting in positive force on each seat ring toward its body sealing surface. In one form the seat rings are wedged against their body sealing surfaces and in another form springs are used to provide the force necessary to maintain the seat rings in their desired engagement with their respective body sealing surfaces.

An object of the present invention is to provide an improved gate valve with seat rings which are not subject to washout.

Another object is to provide an improved gate valve in which the seat rings have a shape which ensures that the seat rings are not urged away from but are urged toward their respective body sealing surfaces by the force of pressure within the valve whether the pressure is from either the upstream or the downstream direction.

A further object is to provide an improved gate valve which prevents extrusion of the resilient seals between the seat rings and their body sealing surfaces.

BRIEF DESCRIPTION OF THE DRAWINGS

These and other objects and advantages of the present invention are hereinafter set forth and explained with reference to the drawings wherein:

FIG. 7 is an exploded view of a pair of seat rings and the pair of wedge strips that are positioned at the side of the gate.

DESCRIPTION OF THE PREFERRED EMBODIMENTS

Figure 1:
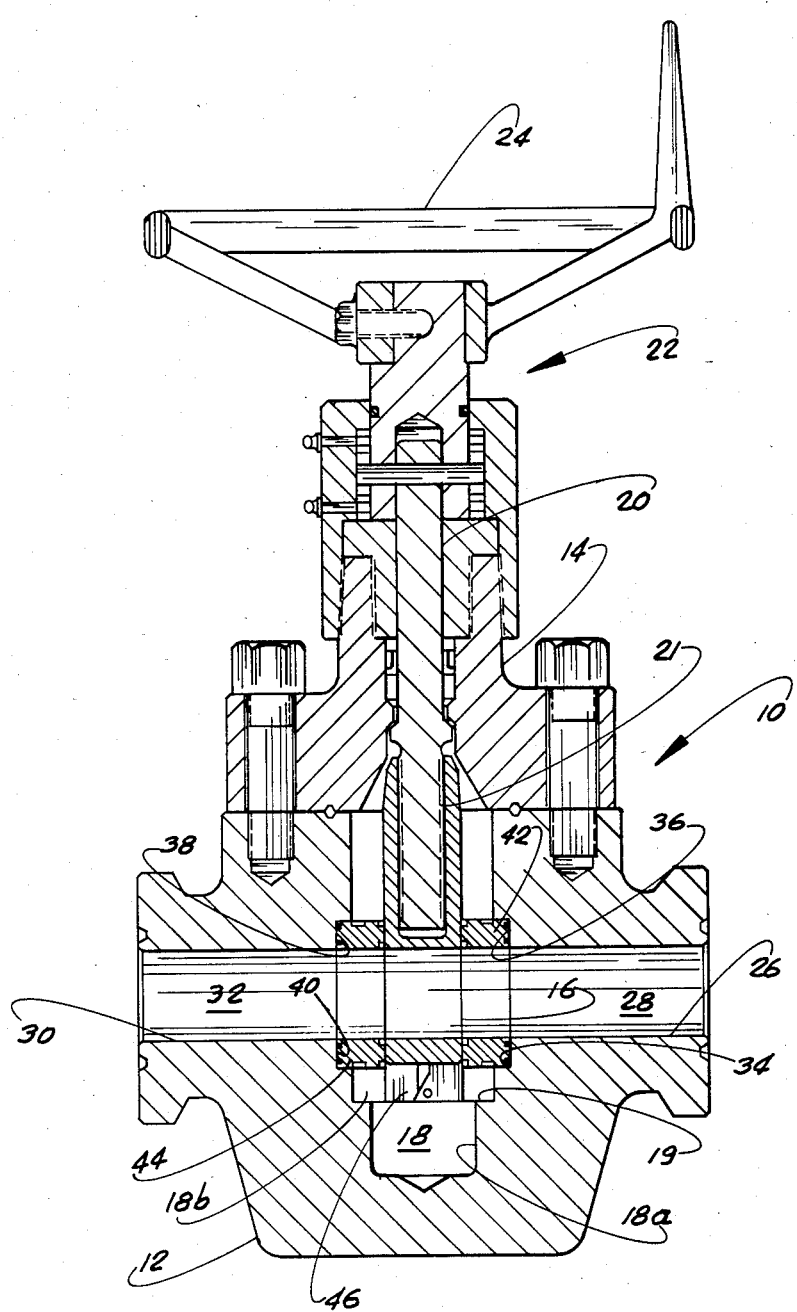
FIG. 1 is a sectional view of the improved gate valve of the present invention.

Gate valve 10 as shown in FIG. 1 includes body 12, bonnet 14 secured to body 12, gate 16 positioned within the body cavity 18, stem 20 which is threadedly connected to gate 16 by loose fitting stub acme type connection 21 and extends through bonnet 14 and means 22 (such as handwheel 24 connected to the outer end of stem 20) for moving gate 16 within body cavity 18 as hereinafter described. Body cavity 18 includes bore 18a and counterbore 18b with shoulder 19. Inlet 26 is provided by passage 28 extending through body 12 into body cavity 18 and outlet 30 is provided by passage 32 extending through body 12 into body cavity 18. Counterbore 34 surrounds the opening of passage 28 into body cavity 18 and provides body sealing surface 36. Counterbore 38 surround the opening of passage 32 into body cavity 18 and provides body sealing surface 40. Inlet seat ring 42 is positioned in counterbore 34 and outlet seat ring 44 is positioned in counterbore 38. Means 46 is provided to maintain both inlet seat ring 42 and outlet seat ring 44 against their respective body sealing surfaces 36 and 40. Means 46 is hereinafter described in more detail and includes two separate forms as disclosed in FIGS. 4, 5, 6 and 7.

Figure 2:
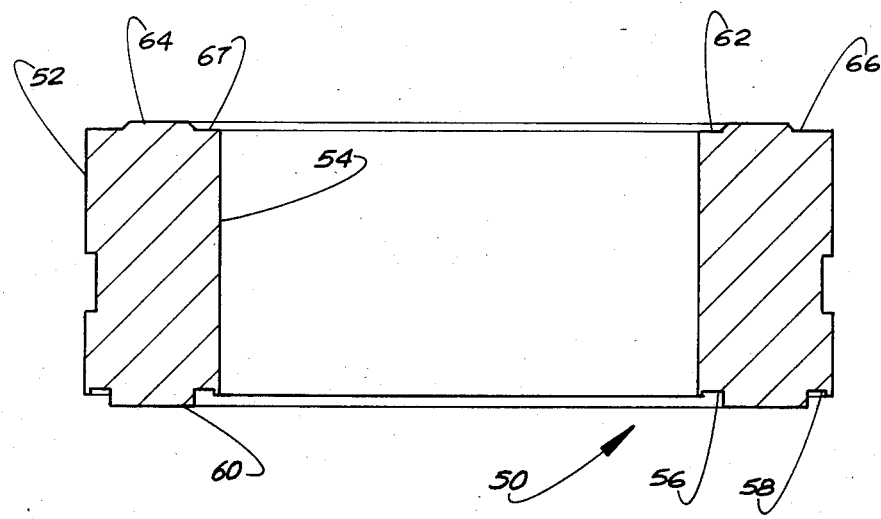
FIG. 2 is a sectional view of one form of the improved gate valve seat ring of the present invention.

In FIG. 2, one form of the improved seat ring of the present invention (designated seat ring 50 but being the same as seat rings 42 and 44) is shown. Seat ring 50 has annular body 52 with bore 54 therethrough, inner sealing ring groove 56 close to bore 54 and outer sealing ring groove 58 near the exterior of body 52. Both grooves 56 and 58 are on body sealing end 60 of ring 50 which is to engage one of body sealing surfaces 36 and 40. End 62, opposite end 60, includes sealing projection 64 with outer annular pressure surface 66 which is to be engaged by the means 46 for urging and maintaining end 60 of seat ring 50 in engagement with its body sealing surface and inner pressure surface 67. Loose fitting stub acme type connection 21 between stem 20 and gate 16 allows gate 16 to "float" axially with respect to seat ring 50 and thereby sealingly engage sealing projection 64. In a typical gate valve it is preferred that the dimensions of the stub acme connection 21 be such that the gate "float" is between 0.006 inch and 0.020 inch.

Figure 3:
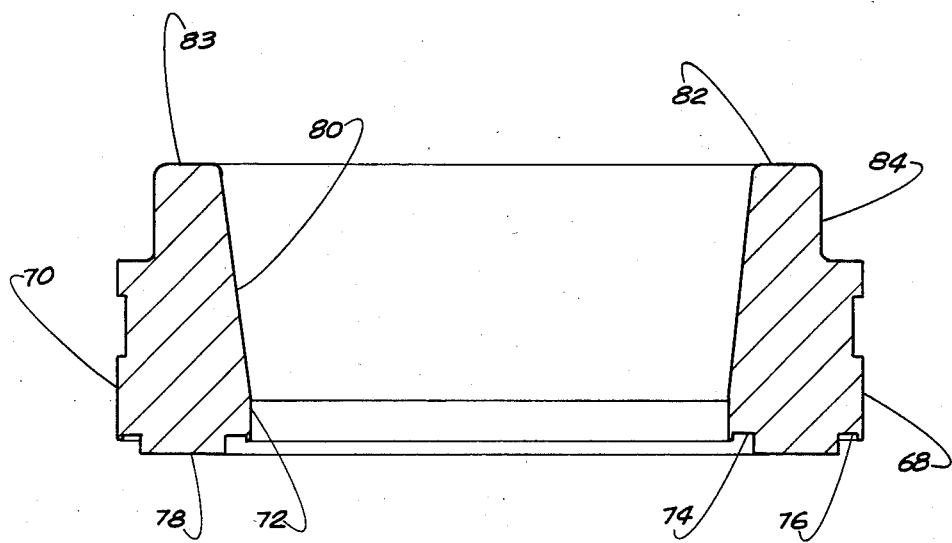
FIG. 3 is a sectional view of another form of the improved gate valve seat ring of the present invention.

Seat ring 68, shown in FIG. 3, is similar to seat ring 50 and includes annular body 70 having bore 72 and inner and outer sealing grooves 74 and 76. Both grooves 74 and 76 are on the body sealing end 78 of seat ring 68. The interior of seat ring 68 tapers outwardly from bore 72 as tapered surface 80 to accommodate gate valves wherein the bore through the gate is larger than the bore of the inlet and outlet passages. End 82 opposite end 78 includes recess 84 at its outer portion to receive means 46. Surface 83 of end 82 sealingly engages the valve gate similar to the sealing engagement between projection 64 and gate 16.

Figure 4:
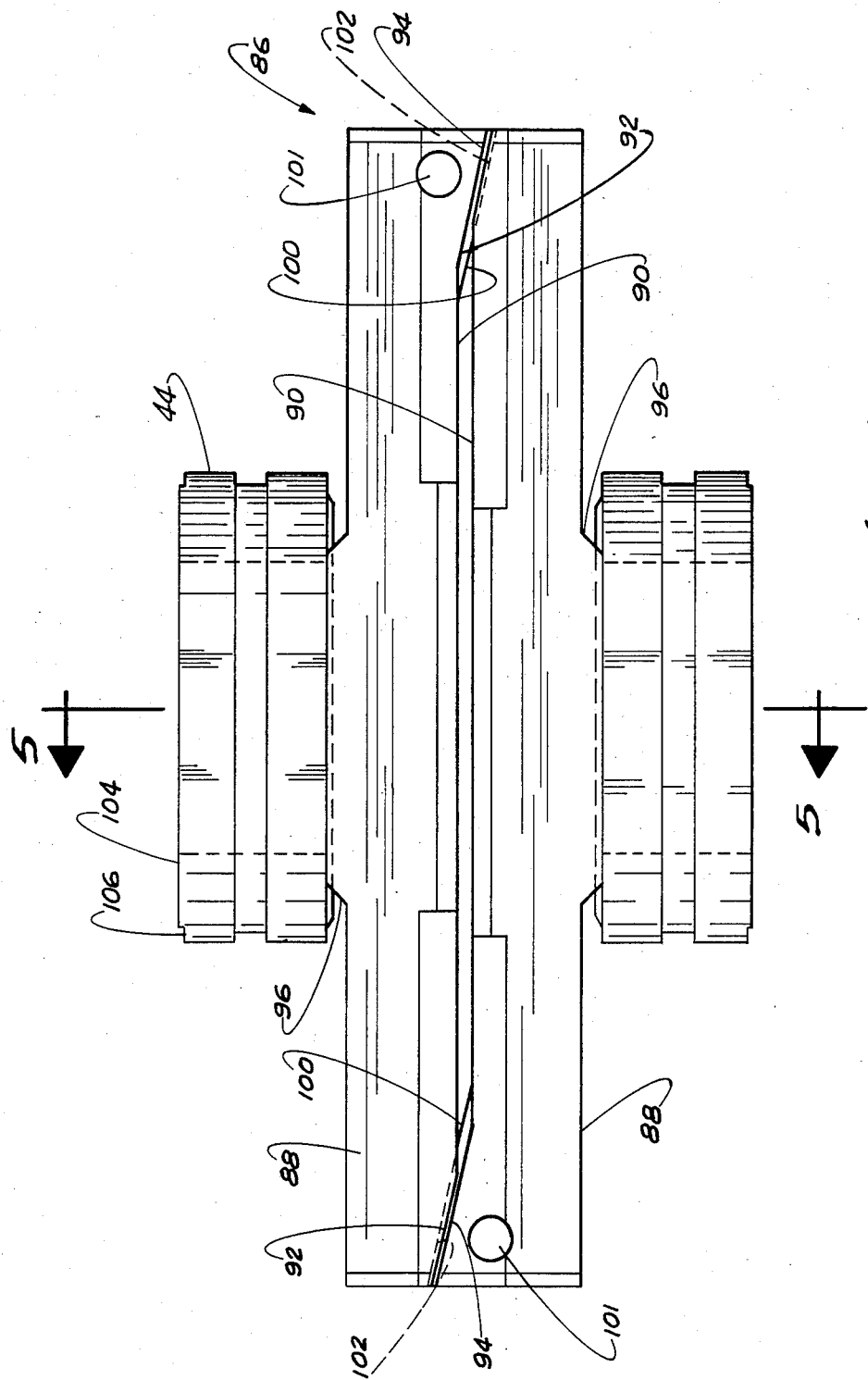
FIG. 4 is a side view of the relative position of the improved seat rings of the present invention and illustrating the wedges used to force the seat rings against their body sealing surfaces with the gate valve body and gate not being shown for purposes of clarity.
Figure 5:
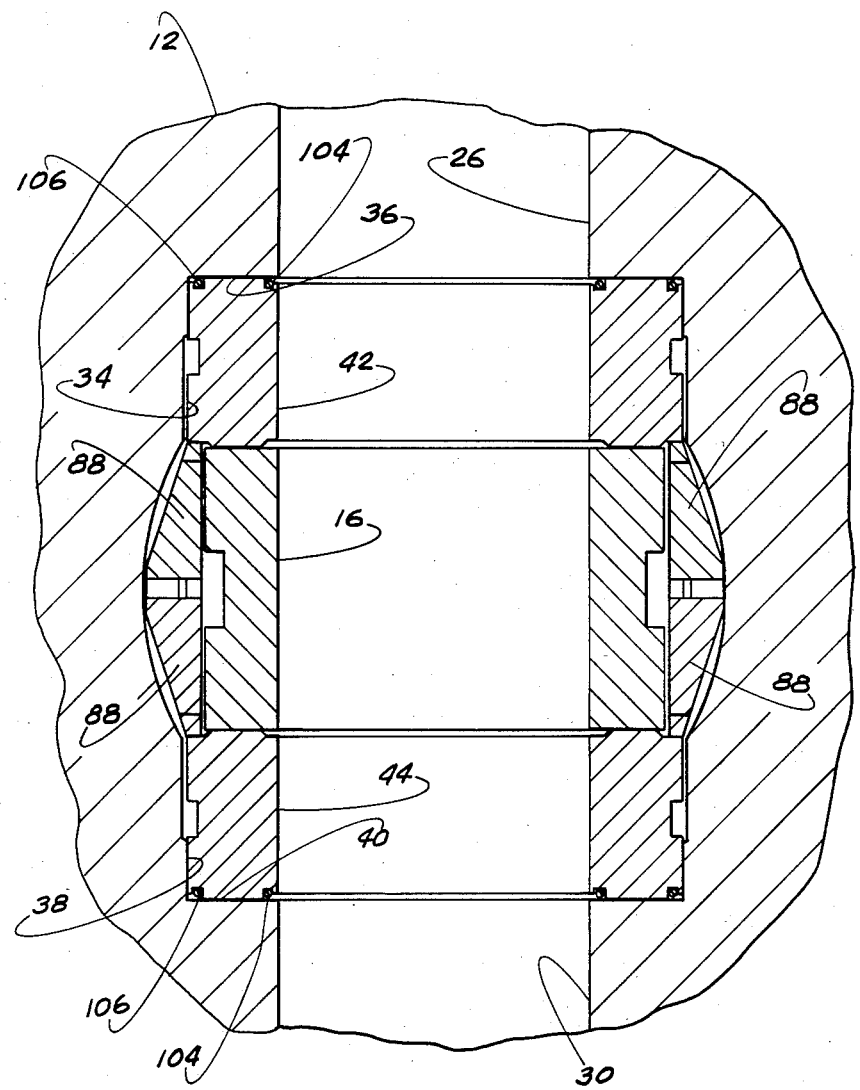
FIG. 5 is a sectional view of the seat rings and wedges taken along line 5—5 in FIG. 4 with portions of the gate valve body and gate included to illustrate the relationship of the wedges, the seat rings and the walls of the valve chamber.

In the preferred form of the present invention shown in FIGS. 4, 5, and 7, means 46 urging and maintaining seat rings 42 and 44 is shown as wedging means 86 which includes a pair of wedge strips 88 positioned in body cavity 18 at each side of gate 16. Each of wedge strips 88 are substantially the same but in each pair one of the strips is rotated 180 degrees so that they interengage as hereinafter described. Each of strips 88 is elongate in shape having an inner mating surface 90 which is adapted to mate with the surface 90 of its mating strip 88. Inner surface 90 extends along a substantial portion of the length of strip 88 and has outwardly directed tapered surface 92 at one end and an inwardly directed tapered surface 94 at the other end. The directions inwardly and outwardly are intended to relate to the direction with respect to the axial centerline of the strip. Projection 96 is provided on outer surface 98 of strip 88. Projection 96 is designed to engage and exert the wedging force on annular surface 66 of the seat ring 42 or 44. Tongue 100 extends from surface 90 and groove 102 is recessed in surface 92. Wedge strips 88 include holes 101, which are used to facilitate their removal.

When strips 88 are positioned together in their operating position surface 92 on one strip engages surface 94 on the other strip with surfaces 90 of each strip being in engagement with each other. In this position, the lower strip 88 shown in FIG. 4 will extend to the left of the left end of the upper strip 88. With seat rings 42 and 44 positioned in their respective counterbores, each pair of strips 88 are moved into body cavity 18 with the outer surfaces of the strips in engagement with the surfaces 66 on the sides of the seat rings. The insertion of strips 88 may require some type of installation tool to maintain seat rings 42 and 44 within their respective counterbores while strips 88 are being installed. After strips 88 are positioned, gate 16 is inserted into its position between seat rings 42 and 44 and between the two pair of strips 88. Thereafter, bonnet 14 is positioned in covering relationship to the opening of body cavity 18 with stem 20 extending through the opening in bonnet 14 and threadedly engaged to gate 16 at connection 21. In this position, the inner end of one strip 88 of each pair is in engagement with shoulder 19 and the outer end of the mating strip 88 of each pair is engaged by bonnet 14. As bonnet 14 is secured to body 12 by the tightening of bolts 14a the movement of bonnet 14 moves the strip extending outward of each pair relative to its mating strip. This movement of strips 88 wedges the seat rings 42 and 44 into tight engagement with their respective body sealing surfaces 36 and 40. This action further causes the resilient sealing elements, such as O rings 104 and 106 in inner and outer grooves 56 and 58 to be compressed and so contained that they are protected from extrusion. For example, inner O rings 104 are exposed to pressure only from the interior of passages 28 and 32, that is the pressure of fluid flowing through gate valve 10 or if gate 16 is closed the pressure of fluid entering through inlet 26. This pressure forces O rings 104 outwardly but because of the engagement of ends 60 with body sealing surfaces 36 and 40 does not cause extrusion of the O rings 104. In a similar manner, O rings 106 are not subjected to the pressure of fluids flowing through valve 10 but are subjected to the pressure of fluids which are within body cavity 18. Since body cavity pressure is exerted on O rings 106 in an inwardly direction with respect to bores 54, the engagement of ends 60 with body sealing surfaces prevents extrusion of O rings 106 which might result from this pressure.

This structure of seat rings 42 and 44 and the position of O rings 104 and 106 provides another advantage. The O rings 104 and 106 being positioned at the outer corners of seat rings 42 and 44 ensure that no pressure leaks into the space between the ends 60 and body sealing surfaces 36 and 40. For this reason all of the pressure exerted on seat rings 42 and 44 is exerted in the direction forcing seat rings 42 and 44 toward their respective body sealing surfaces. The pressure of fluid flowing through the valve is effective on the small area inside the effective diameter of the sealing circle of O ring 104 and on the larger area of inner pressure surface 67. This differential pressure area acts to urge seat rings 42 and 44 towards their respective body sealing surfaces 36 and 40. The pressure of fluid within body cavity 18 is effective on the small area outside the effective diameter of the sealing circle of O ring 106 and on the larger area of outer pressure surface 66. This differential pressure area also acts to urge seat rings 42 and 44 towards their respective body sealing surfaces 36 and 40. The pressures exerted on seat rings 42 and 44 in the opposite directions (toward the body sealing surfaces) is exerted on a much greater area to create a force urging the seat ring toward their sealing surfaces.

Figure 6:
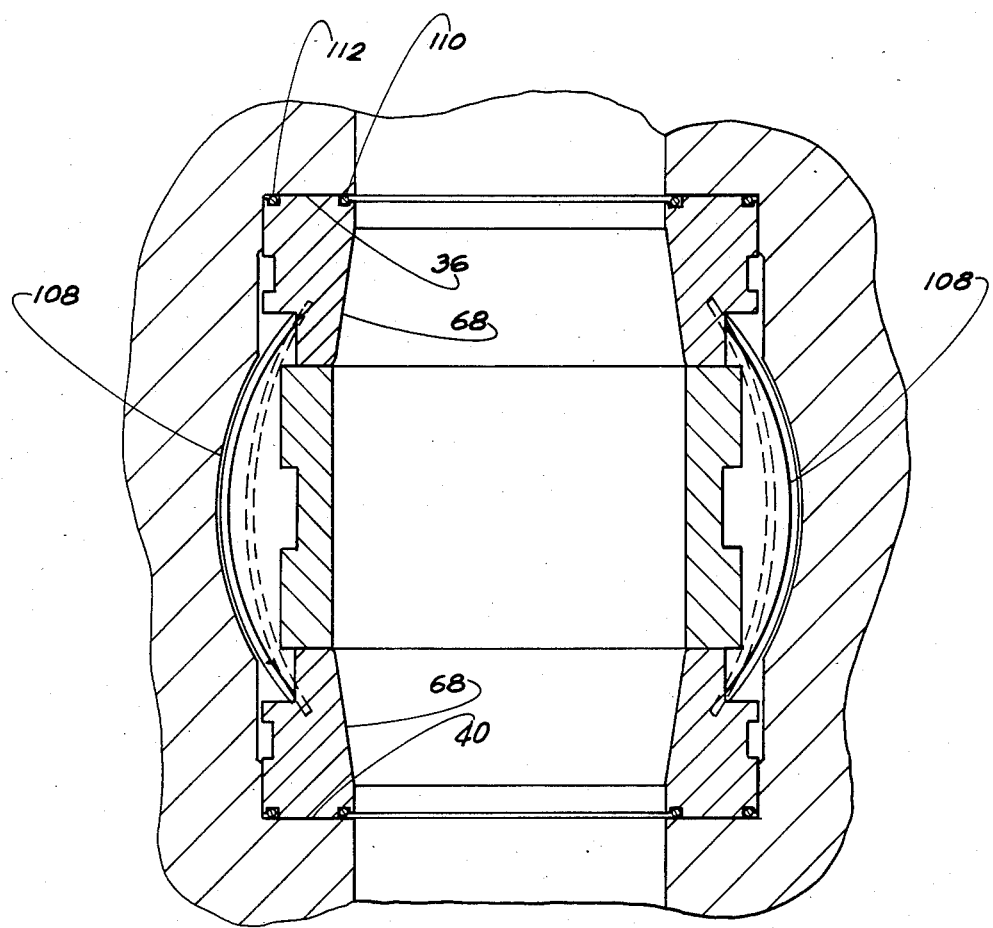
FIG. 6 is another sectional view similar to FIG. 5 of the seat rings and springs which are used for retaining the seat rings against their respective body sealing surfaces.

The structure shown in FIG. 6 discloses a modified form of means 46 for urging and maintaining seat rings 68 against their respective sealing surfaces 36 and 40. In this form of the invention, seat ring 68 shown in FIG. 3 is used and, as previously described, is substantially similar to seat ring 50 with the exception that it has external recess 84 for receiving the ends of springs 108 as best shown in FIG. 6. To show the action of springs 108, they are shown in their relaxed position in dashed lines. After seat rings 68 are inserted into their respective body counterbores 34 and 38, springs 108 are bowed and inserted into body cavity 18 with their ends in recesses 84 to exert sufficient force to urge and maintain ends 78 in engagement with their respective body sealing surfaces 36 and 40. It is suggested that springs 108 have a taper on their outer edges so that their shortest edge can be inserted between seat rings 68 and forced downwardly to force seat rings 68 into their desired positions. In this form of seat rings, O rings 110 and 112 are provided in inner and outer grooves 74 and 76 to provide the resilient seal against body sealing surfaces 36 and 40 and having the same inner and outer positions as described and shown with respect to seat ring 50 will create a pressure force urging seat rings 68 against sealing surfaces 36 and 40 to ensure that there is not extrusion of O rings 110 and 112.

It should also be noted that the use of means 46 to urge and maintain one end of the seat rings in engagement with their respective body sealing surfaces not only ensures the prevention extrusion of the resilient sealing elements but also prevents the intrusion of sand or other particles which would contribute to the washout of the seat rings.

What is claimed is:

1. A gate valve comprising
    a body having a chamber opening to the exterior of said body, a pair of passages extending through said body and opening into said chamber, a counterbore surrounding the opening of each of said passages into said chamber to provide a pair of body sealing surfaces facing into said chamber,
    a pair of seating rings positioned one in each of said counterbores,
    resilient sealing means associated with each of said seat rings for sealing against the body sealing surface of each seat ring,
    a gate positioned in said chamber between said seat rings and movable therein to open and close flow between said passages,
    a bonnet secured to said body in sealing relationship around the opening of said chamber from said body,
    means for moving said gate between positions opening and closing said flow between said passages, and
    a pair of wedge strips which extend along the sides of said gate between said seat rings,
    each of said wedge strips have a pair of tapered surface to engage the tapered surfaces of its mating wedge strip,
    said tapered surfaces positioned so that relative movement of mating strips toward moving their ends to the same level cause said strips to be wedged apart which wedge the seat rings into engagement with their body sealing surfaces.

2. A gate valve comprising
    a body having a chamber opening to the exterior of said body, a pair of passages extending through said body and opening into said chamber, a counterbore surrounding the opening of each of said passages into said chamber to provide a pair of body sealing surfaces facing into said chamber,
    a pair of seat rings positioned one in each of said counterbores,
    resilient sealing means associated with each of said seat rings for sealing against the body sealing surface of each seat ring,
    a gate positioned in said chamber between said seat rings and movable therein to open and close flow between said passages,
    a bonnet secured to said body in sealing relationship around the opening of said chamber from said body,
    means for moving said gate between positions opening and closing said flow between said passages, and
    said springs are wide bowed strips extending between said seat ring at each side of said gate urging said seating rings against their body sealing surfaces.

3. A gate valve comprising
    a body having a chamber opening to the exterior of said body, a pair of passages extending through said body and opening into said chamber, a counterbore surrounding the opening of each of said passages into said chamber to provide a pair of body sealing surfaces facing into said chamber, and a shoulder within said chamber facing toward the open end of said chamber,
    a pair of seat rings positioned one in each of said counterbores,
    resilient sealing means associated with each of said seat rings for sealing against the body sealing surface of each seat ring,
    a gate positioned in said chamber between said seat rings and movable therein to open and close flow between said passages,
    a bonnet secured to said body in sealing relationship around the opening of said chamber from said body,
    means for moving said gate between positioned opening and closing said flow between said passages,
    a pair of wedge strips positioned axially along each side of said gate with their outer surfaces engaging said seat rings,
    each of said strips having tapered surfaces which engage the tapered surfaces of the other of said strip,
    at least one of said wedge strips having its inner end in engagement with said chamber shoulder, and
    said tapered surfaces of said strips positioned so that connection of said bonnet to said body engages the outer end of the other of said wedge strips and forces the extending strip inwardly to wedge the mating strips apart at each side of said gate and thus urge said seat rings into tight engagement with their body sealing surfaces.

4. A gate valve according to claim 2 wherein said resilient sealing means includes
    a resilient sealing ring positioned between each of said seat rings and said body sealing surface at a position near the interior of said seat rings, and
    a resilient sealing ring positioned between each of said seat rings and said body sealing surface at a position near the exterior of said seat rings.

* * * * *